US009970209B2

(12) United States Patent
Durvasula et al.

(10) Patent No.: US 9,970,209 B2
(45) Date of Patent: May 15, 2018

(54) METHOD AND APPARATUS FOR COMMUNICATING OVER A TWO-WIRE POWER CABLE BETWEEN AN EXTERNAL POWER SUPPLY AND A SELF-PROPELLED ROBOTIC SWIMMING POOL CLEANER

(71) Applicant: AQUA PRODUCTS, INC., Cedar Grove, NJ (US)

(72) Inventors: Kameshwar Durvasula, Garfield, NJ (US); Mark Sphilman, Fairlawn, NJ (US)

(73) Assignee: Aqua Products, Inc., Cedar Grove, NJ (US)

( * ) Notice: Subject to any disclaimer, the term of this patent is extended or adjusted under 35 U.S.C. 154(b) by 255 days.

(21) Appl. No.: 15/079,401

(22) Filed: Mar. 24, 2016

(65) Prior Publication Data

US 2016/0281380 A1 Sep. 29, 2016

Related U.S. Application Data

(60) Provisional application No. 62/138,771, filed on Mar. 26, 2015.

(51) Int. Cl.
*G05D 1/00* (2006.01)
*E04H 4/16* (2006.01)
(Continued)

(52) U.S. Cl.
CPC ........... *E04H 4/1654* (2013.01); *C02F 1/001* (2013.01); *C02F 1/008* (2013.01); *H02P 7/28* (2013.01);
(Continued)

(58) Field of Classification Search
CPC ....................................................... H02P 7/292
(Continued)

(56) References Cited

U.S. PATENT DOCUMENTS 5,569,371 A 10/1996 Perling
6,496,755 B2 * 12/2002 Wallach ............... G05D 1/0274
318/568.11
(Continued)

FOREIGN PATENT DOCUMENTS

CN 102943576 A 2/2013
EP 1122382 A1 8/2001
(Continued)

*Primary Examiner* — David S Luo
(74) *Attorney, Agent, or Firm* — Ableman, Frayne & Schwab

(57) ABSTRACT

A robotic pool cleaner includes a housing with an interior chamber. A filter within the interior chamber filters water drawn through a water inlet provided in a bottom portion of the housing. Filtered water is discharged through a discharge port provided in a upper portion of the housing. Rotatably-mounted supports attached to the housing support and guide the cleaner on the pool surface. An electric motor mounted in the chamber is configured to move the cleaner on a pool surface. A pool cleaner controller electrically connected to the electric motor controls movement of the cleaner and receives communication signals transmitted by a remote power supply over a two-wire electric cable having first and second conductors. The pool cleaner controller is configured to provide uninterrupted electric power to the electric motor while the pool cleaner controller also receives pulsed communication signal from the remote power supply over the two-wire cable.

26 Claims, 7 Drawing Sheets

(51) Int. Cl.
    *C02F 1/00*         (2006.01)
    *H02P 7/28*         (2016.01)
    *C02F 103/42*      (2006.01)

(52) U.S. Cl.
    CPC .... *C02F 2103/42* (2013.01); *C02F 2201/006* (2013.01); *C02F 2201/008* (2013.01); *C02F 2209/006* (2013.01); *C02F 2209/008* (2013.01); *C02F 2209/44* (2013.01)

(58) Field of Classification Search
    USPC ...................................................... 318/3, 34
    See application file for complete search history.

(56) References Cited

U.S. PATENT DOCUMENTS

| | | |
|---|---|---|
| 2005/0262652 A1 | 12/2005 | Sumonthee |
| 2013/0104321 A1 | 5/2013 | Michelon |
| 2013/0110319 A1 | 5/2013 | Michelon |
| 2014/0015959 A1 | 1/2014 | Durvasula et al. |
| 2014/0137343 A1 | 5/2014 | Corea et al. |
| 2014/0262997 A1 | 9/2014 | Renaud et al. |
| 2014/0263087 A1 | 9/2014 | Renaud et al. |
| 2014/0303810 A1 | 10/2014 | Van Der Meijden et al. |

FOREIGN PATENT DOCUMENTS

| | | |
|---|---|---|
| FR | 2920456 A1 | 9/2004 |
| WO | 2004019295 A1 | 3/2004 |
| WO | 2013160628 A1 | 10/2013 |

\* cited by examiner

METHOD AND APPARATUS FOR COMMUNICATING OVER A TWO-WIRE POWER CABLE BETWEEN AN EXTERNAL POWER SUPPLY AND A SELF-PROPELLED ROBOTIC SWIMMING POOL CLEANER

CROSS-REFERENCE TO RELATED APPLICATION

This patent application claims the benefit of U.S. Provisional Application No. 62/138,771, filed Mar. 26, 2015, the content of which is incorporated by reference herein in its entirety.

FIELD OF INVENTION

The invention relates to self-propelled robotic pool cleaners, and more specifically, to a method and apparatus for communicating electronic control signals between the pool cleaner and an external power supply.

BACKGROUND OF INVENTION

Self-propelled robotic pool cleaners include one or more drive motors to move or otherwise propel the cleaner over a surface of a pool being cleaned. The movement of the cleaner can be random or preferably is in accordance with a predetermined cleaning pattern. An electronic controller with memory is provided on the robotic pool cleaner for storing and executing cleaning programs, as well as other information to enable efficient cleaning of the pool.

The pool cleaner receives power from an external power supply via a floating power cable having a pair of conductors. Typically, the external power supply is fabricated from light-weight, buoyant corrosion-resistant materials, e.g., polyvinylchloride (PVC), polypropylene, among other well-known thermoplastic materials, aluminum and/or alloys thereof, and/or combinations thereof, and/or other corrosion resistant, water impermeable materials. The power supply is configured to be portable so that an end-user can easily move the power supply from a remote storage area to a location in close proximity to the pool so that the cleaner is free to operate without straining the power cable. As a further convenience, many pool cleaner manufacturers provide a handcart which is configured to transport the cleaner, the cable and the power supply to and from the pool.

The external power supply includes an internal power transformer and/or switching circuitry to enable operation from a conventional wall outlet or socket (e.g., 120 VAC (alternating current voltage) which is readily available at the end-user's residence or other facility. The transformer and/or switching circuitry converts the AC power from the conventional wall socket to a direct current voltage (VDC) output signal at a relatively lower voltage that is sufficient to operate the drive and/or pump motor(s) and control the pool cleaner during its cleaning operation.

The pool cleaner power cable is typically fabricated from two wire conductors having sufficient length to enable the cleaner to move over the entire bottom surface of the pool. The conductors have a protective covering that is typically fabricated from a foamed polymeric material that is buoyant and enables the cable to float as the submerged cleaner moves over the bottom and, optionally, the sidewall surfaces of the pool.

The power supply provides electrical power to drive one or more motors that propel the cleaner over the pool surfaces. For example, the one or more motors can rotate the wheels, roller brushes, and/or tracks via a transmission assembly. Alternatively, a pump motor having one or more propellers can be used to discharge a pressurized stream of filtered water in the form of a water jet that also propels the cleaner in a direction opposite the water jet. Some of the power from the power cable can also be directed to an onboard controller which includes a microcontroller, logic circuitry and/or software programs to control the movement of the cleaner.

It would be desirable if the power supply were capable of communicating with the pool cleaner. For example, initiating diagnostic tests of the pool cleaner from the power supply and then receiving signals indicating the status of various operations and components could be used to properly maintain the cleaner and improve cleaning performance and operations. Cleaner status reports, i.e., data in the form of signals, from diagnostic tests can be used to initiate visual/audible alarms to alert the user of malfunctions occurring in a drive motor, pump motor, electronic circuitry, or the like.

Because the cleaner does not have its own power source and the power cable is typically a two-wire cable, communications are limited between the power supply and the pool cleaner. One option is to send communication signals over the two-wire cable in the form of pulsed power signals. However, such pulsed power signals can cause the drive motor(s), cleaner logic and support circuitry of the cleaner to intermittently lose power, as well as lose their ground reference in the cleaner.

A three-wire cable can be utilized to provide full-duplex communications to send communication signals without the power interruptions and ground reference losses; however, such three-conductor cables are significantly more expensive than two-wire power cables.

It is desirable to provide communication signals between two electronic devices over a two-wire power cable, where one of the devices has an internal power source and the other device does not. It is further desirable to provide communication signals between an external power supply and a self-propelled robotic pool cleaner over a two-wire power cable, where the robotic pool cleaner does not have an internal power source, but receives power from the external power supply. It is further desirable to provide communication signals from the external power supply to a self-propelled robotic pool cleaner while maintaining uninterrupted power to the cleaner. It is also desirable to provide communications over a two-wire cable between the power supply and the cable, and also to enable control of the pool cleaner programming from the control circuitry of the power supply.

SUMMARY OF THE INVENTION

The disadvantages heretofore associated with the prior art are overcome by the present invention of a robotic pool cleaner that includes a housing with an interior chamber, a filter within the interior chamber which filters water drawn through a water inlet provided in a bottom portion of the housing, and filtered water is discharged through a discharge port provided in a upper portion of the housing. Rotatably-mounted supports are attached to the housing to support and guide the cleaner on the pool surface. An electric motor is mounted in the chamber and is configured to move the cleaner on a pool surface. A pool cleaner controller that is electrically connected to the electric motor controls movement of the cleaner and receives communication signals transmitted by a remote power supply over a two-wire electric cable having first and second conductors. The pool cleaner controller is configured to provide uninterrupted electric power to the electric motor while the pool cleaner controller also receives pulsed communication signal from the remote power supply over the two-wire cable.

In one embodiment, a system a pool cleaning system for cleaning a submerged surface of a pool includes a robotic pool cleaner electrically connected to a remote power supply via a two-wire electric cable having first and second conductors, the system comprising: the robotic pool cleaner comprising: a housing including an upper portion disposed over a base to define an interior chamber, the base including at least one water inlet and the upper portion having at least one water discharge port; rotatably-mounted supports for supporting and guiding the cleaner on the pool surface; a filter assembly for filtering water drawn through the at least one water inlet; an electric motor mounted in the interior chamber and configured to move the cleaner on the pool surface; and a pool cleaner controller electrically connected to the electric motor for controlling movement of the cleaner and receiving communication signals transmitted by the remote power supply; and the remote power supply comprising: a power supply controller for providing DC power to the electric motor of the cleaner over the two-wire electric cable, the power supply controller being configured to pulse the DC power at a predetermined frequency for a predetermined period of time to define the communication signals that are transmitted to the pool cleaner controller.

In one aspect, the remote power supply includes an AC to DC power converter for converting AC power to DC power. In another aspect, the electric motor receives DC electric power at a substantially constant level and the pool cleaner controller receives the pulsed communication signal from the power supply controller.

In one aspect, the first conductor of the two-wire electric cable has a first end configured to receive DC power from the power supply and a second end coupled to the electric motor via the pool cleaner controller, and the second conductor of the two-wire electric cable has a first end coupled to the electric motor via the pool cleaner controller and a second end coupled to the ground reference of the power supply via a switching circuit. In a further aspect, the power supply controller includes a supply microcontroller and the second conductor is connected to either a transmit line Tx or a receive line Rx of the microcontroller via the switching circuit. In yet another aspect, the switching circuit comprises a switch coupled between the second end of the second conductor and the ground reference of the power supply. In still another aspect, the switch is closed during normal operation when no pulsed communication signal is being sent by the power supply. In a further aspect, the pulsed communication signal is generated by turning the switch on and off. In yet another advantageous aspect, during the normal operation current flows through the first conductor, through the motor and returns to a ground reference of the power supply over the second conductor.

In one aspect, the pool cleaner controller includes a capacitor coupled parallel to the electric motor between the first conductor and the second conductor of the two-wire electric cable. In still another aspect, the capacitor is charged by the two conductors during normal operation without a pulsed communication signal being sent by the power supply to the cleaner. In another aspect, the capacitor is discharged during a pulsed communication signal sent by the power supply to the cleaner. In still another aspect, the current discharged by the capacitor flows to the electric motor during the pulsed communication signal.

In one aspect, the pool cleaner controller and the power supply controller communicate with each other using a half-duplex communication mode of operation. In another aspect, the switch is turned on and off at a predetermined frequency and for a predetermined period of time by the supply microcontroller to thereby define the pulsed communications signal. In a further aspect, the pool cleaner controller includes a cleaner microcontroller having a receiving line for receiving pulsed signals from the power supply controller and a transmission line for sending pulsed signals back to the power supply controller in response to the pulsed signals. In yet another aspect, the power supply controller includes a supply microcontroller having a transmission line for sending pulsed signals to the pool cleaner controller and a receiving line for receiving pulsed signals from the pool cleaner controller in response to the pulsed signals sent.

In another embodiment, the a robotic pool cleaner comprises: a housing including an upper portion disposed over a bottom portion to define an interior chamber, the bottom portion including at least one water inlet and the upper portion having at least one water discharge port; rotatably-mounted supports supporting and guiding the cleaner on the pool surface; a filter assembly for filtering water drawn through the at least one water inlet; an electric motor mounted in the interior chamber and configured to move the cleaner on the pool surface; and a pool cleaner controller electrically connected to the electric motor for controlling movement of the cleaner and receiving communication signals transmitted by a remote power supply over a two-wire electric cable having first and second conductors, wherein the pool cleaner controller is configured to provide electric power to the electric motor while the pool cleaner controller receives pulsed communication signal from the remote power supply over the two-wire cable.

In one aspect, the pool cleaner controller includes a capacitor coupled parallel to the electric motor between the first conductor and the second conductor of the two-wire electric cable. In another aspect, the capacitor is charged by the two conductors during normal operation when no pulsed communication signal is being sent by the power supply to the cleaner. In a further aspect, the capacitor is discharged when a pulsed communication signal is sent by the power supply to the cleaner. In yet another aspect, the pool cleaner controller includes a cleaner microcontroller having a receiving line configured to receive pulsed signals from a power supply controller of the power supply and a transmission line configured to send pulsed signals back to the power supply controller in response to the receipt of pulsed signals.

In another embodiment, a method for sending pulsed signals from a remote power supply to a self-propelled robotic pool cleaner over a two-wire electric cable having first and second conductors, the method comprises: converting AC power to DC power at the power supply; transmitting the DC power from a power supply controller of the power supply to an electric motor and a pool cleaner controller on board the pool cleaner over the two-wire cable during normal cleaning operations; pulsing the DC power on and off from the power supply at a predetermined frequency and for a predetermined period of time to define a pulsed communication signal; providing power from the pool cleaner controller to the electric motor during a power interruption from the pulsed communication signal; and receiving the pulsed communication signal at the pool cleaner controller while providing power to the electric motor.

In one aspect, after the step of receiving the pulsed communication signal at the pool cleaner controller, the method further comprises sending a pulsed return communications signal from the pool cleaner controller to the power supply controller over the two-wire cable. In another aspect, the step of providing power from the pool cleaner controller to the electric motor during a power interruption comprises directing current from a discharged capacitor to the electric motor. In still another aspect, the step of pulsing the DC power on and off from the power supply comprises operating a switch coupled to the first conductor between the on and off position at the predetermined frequency and for the predetermined period of time.

Figure 1:
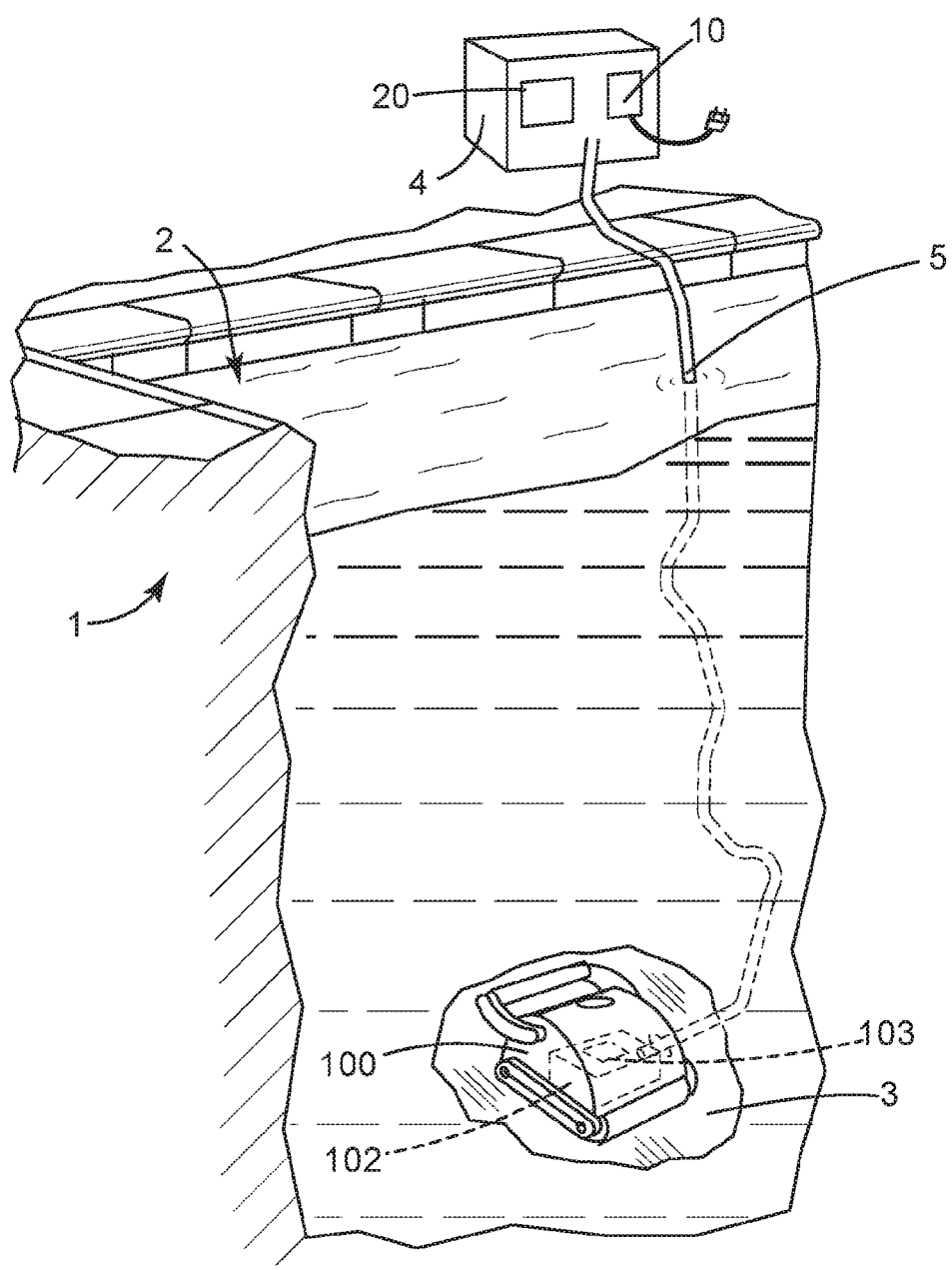
FIG. 1 is a perspective view of a portion of a swimming pool, partly in section, on which has been positioned an illustrative robotic pool cleaner that is powered by and communicates electronically with an external power supply in accordance with the invention.

To further facilitate an understanding of the invention, the same reference numerals have been used, when appropriate, to designate the same or similar elements that are common to the figures. Further, unless otherwise indicated, the features shown in the figures are not drawn to scale, but are shown for illustrative purposes only.

DETAILED DESCRIPTION OF THE INVENTION

The invention is directed to enabling two electronic devices to communicate with each other over a two-wire power cable, where one of the devices has an internal power source and the other device does not. Specifically, the external power supply which provides DC power to the robotic pool cleaner includes a controller having a transmitter and a receiver for sending and receiving pulsed signals in communication with a pool cleaner which does not include its own on-board power source. Communication signals to the cleaner are preferably sent by pulsing the electrical power transmitted to the cleaner via the two-wire cable. The power supply and the pool cleaner are provided with communications circuitry as described in further detail below and with reference to the drawings.

Referring to FIG. 1, a sectional view of an in-ground swimming pool 1 is shown. The swimming pool includes a bottom surface and generally vertical sidewalls which form a container to hold the pool water 2. Although the pool 1 is described as an in-ground pool, such configuration is not to be considered limiting. For example, the swimming pool can also be an above-ground pool, a tank or other water container that requires cleaning of its surfaces and filtering of the water. An illustrative self-propelled robotic pool cleaner 100 is shown positioned on the bottom surface 3 of the pool 1. The pool cleaner 100 has one or more electric drive motors which cause the cleaner to move over and clean the pool surfaces 3 beneath the cleaner. The pool cleaner 100 receives its electric power from an external power supply 4 via an electric power cable 5 to which it is connected. The power cable 5 includes two wire conductors that are preferably encased in a foamed polymeric composition that renders the cable buoyant so that it will float on the water's surface.

The power supply includes a transformer or switching circuitry 10 having a power input adaptor suitable for connection to an alternating current (AC) power source, such as a conventional 120 VAC outlet receptacle located nearby the pool at an end-user's residence or other location. The transformer or switching circuitry 10 converts the AC power to a predetermined direct current (DC) voltage, such as 48 VDC. The power supply 4 further includes a controller 20 for controlling the DC power sent to the pool cleaner 100 via the cable 5.

Figure 2:
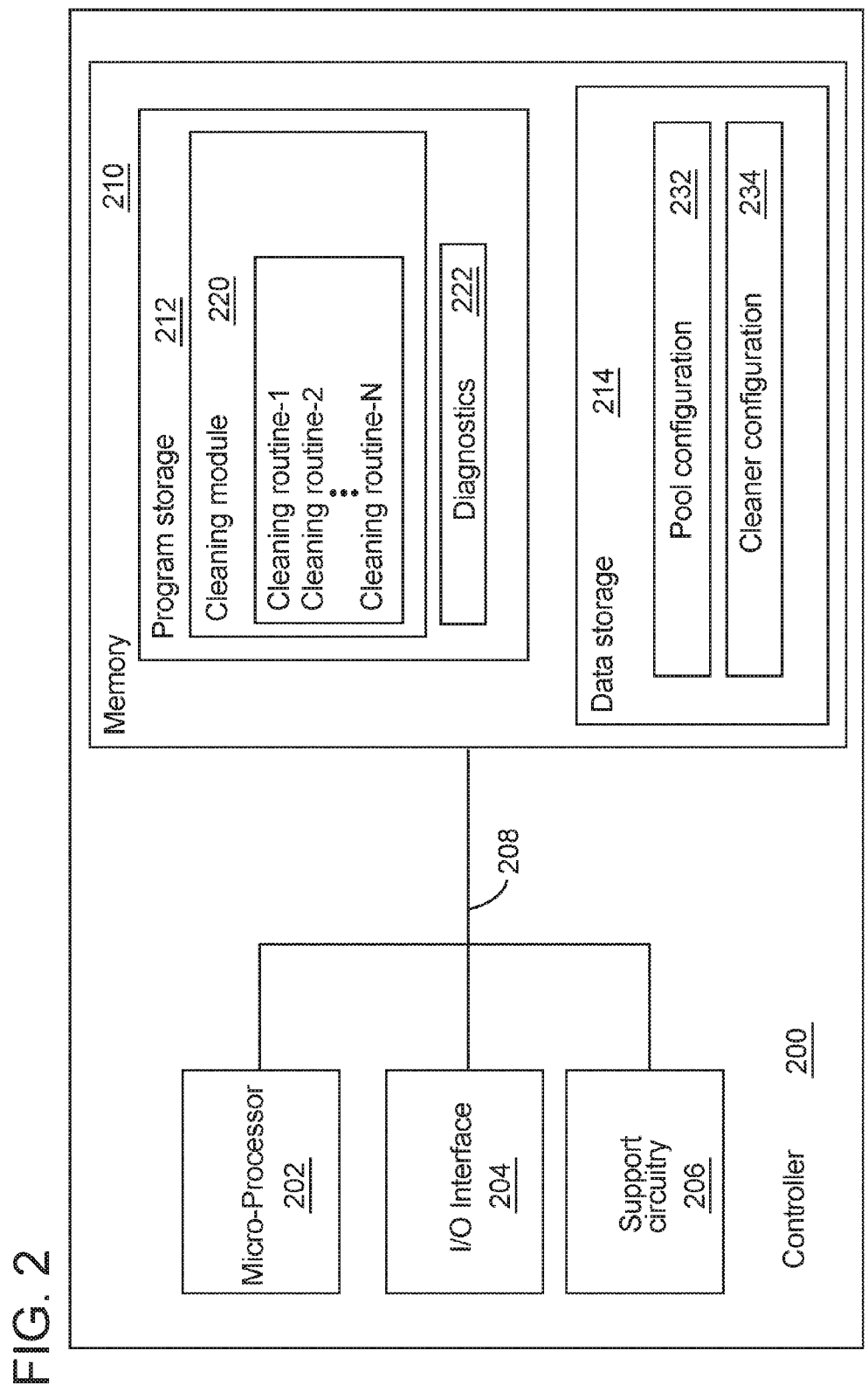
FIG. 2 depicts a high-level block diagram of a controller suitable for use in a power supply for the robotic pool cleaner 100 of FIG. 1.

Referring to FIG. 2, a high-level block diagram of a representative power supply microcontroller 200 is illustrated. The microcontroller 200 comprises at least one processor 202, as well as memory 210 for storing various control programs 212. The microprocessor 202 cooperates with support circuitry 206, such as communications circuits, timers, and cache memory, among other conventional support circuitry, to assist in executing such software routines as cleaning patterns, diagnostics, and the like, that are programmed or stored in the memory 210. The microcontroller 200 also comprises input/output (I/O) circuitry 204 that forms an interface between various functional elements communicating with the pool cleaner 1. For example, the microcontroller includes transmission and receiver lines for exchanging communication signals with the pool cleaner 1 via the two-wire power cable 5.

The microprocessor 202, memory 210, support circuitry 206 and I/O circuitry 103 are generally embedded in a single integrated circuit and are all commonly connected to each other through one or more bus lines and/or conductors 208. One of ordinary skill in the art will appreciate that the functionality of the microcontroller can alternatively be provided using separate components including a microprocessor, memory devices and other support circuitry interconnected on a printed circuit board.

The memory 210 comprises program storage 212 and data storage 214 areas. The program storage 212 includes a cleaning module or programming 220 that can have one or more cleaning routines (e.g., cleaning routine 1 through N, where N is an integer greater than 1). The program storage 212 can also include diagnostics programs 222 to run self-diagnostics and/or diagnostics on the pool cleaner 1, among other application programs. The data storage 214 includes content related to the configuration of the pool 232, such as, for example, its dimensions, type of pool surface, water type (e.g., salt or no salt), and the like, as well as content related to the configuration of the pool cleaner 234, such as power requirements, motor specifications, protocols, among other information. Any of the software program modules in the program storage 212 and data from the data storage 214 are transferred to specific memory locations as needed for execution by the microprocessor 202. It is contemplated that some of the process steps discussed herein as software processes may be implemented within hardware, for example, as circuitry that cooperates with the microcontroller 20 to perform various steps. Although the microcontroller 200 is discussed in terms of being implemented in the power supply 4, a person of ordinary skill in the art will appreciate that the same or a similar microcontroller can be implemented in the pool cleaner with necessary programming and support circuitry to operate the cleaner, as discussed below with reference to FIG. 3.

Figure 3:
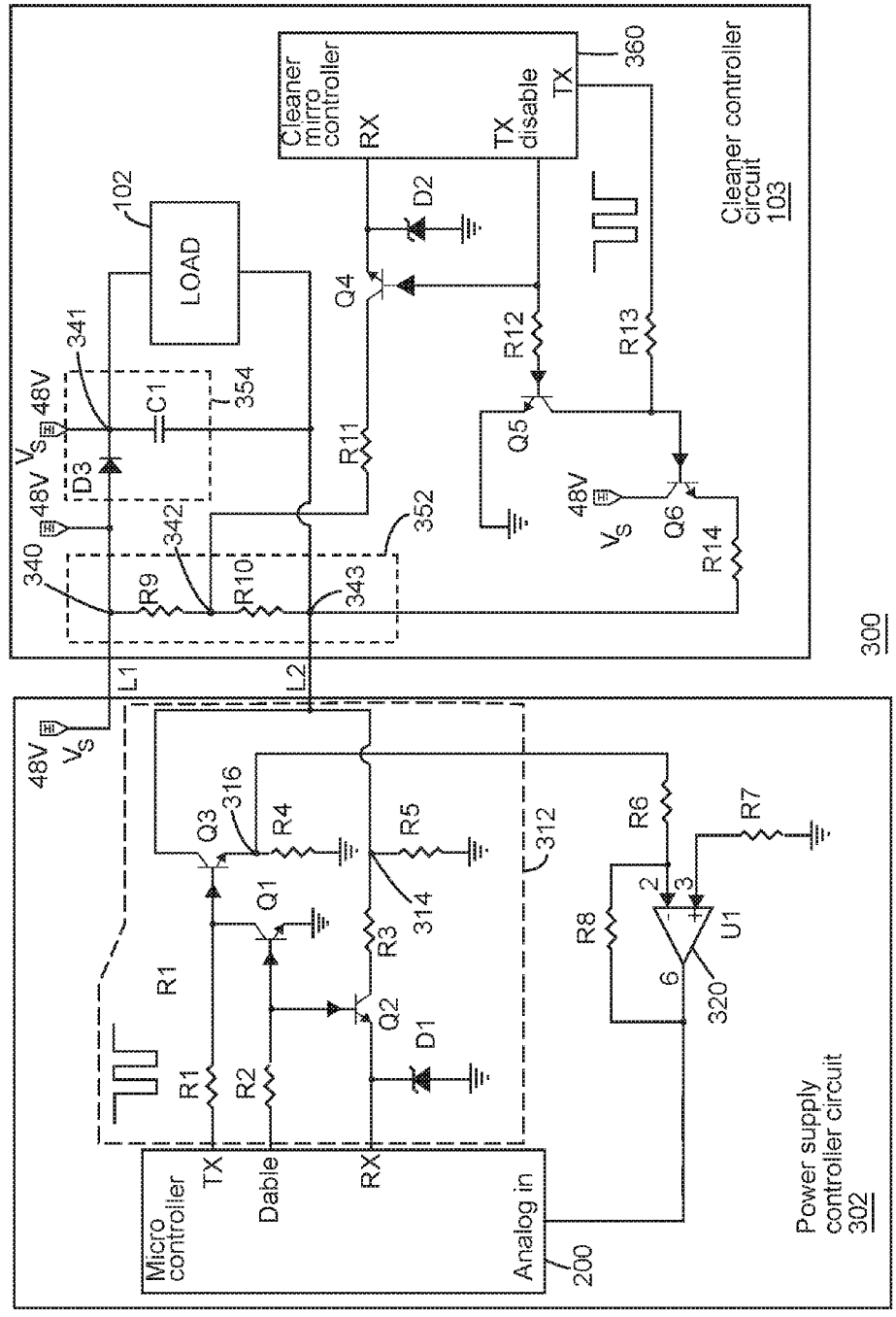
FIG. 3 is a schematic diagram of electronic circuitry for providing electronic communication signals between the external power supply and pool cleaner of FIG. 1.

Referring now to FIG. 3, an illustrative power and communications circuit 300 that is formed and operable between the power supply 4 and the robotic pool cleaner 100 is shown. The left side of the circuit 300 represents power supply controller circuitry 302, while the right side of the circuit 300 illustrates the pool cleaner controller circuitry 103. The circuit 300 operates over a two-wire floating cable (e.g., cable 5 of FIG. 1) which includes a first conductor L1 and a second conductor L2.

Communications are initiated by the power supply controller 302, and the pool cleaner controller 103 can only respond with information (i.e., one or more pulsed signals), if necessary, when transmission by the power supply ceases. Thus, the present invention provides communications using a half-duplex signal transmission mode of operation.

The types of components and their values described herein are for illustrative purposes only and are not to be considered limiting. For example, the transistors are described as being NPN type transistors, although PNP type transistors or other types of transistors (e.g., FETs) or combinations thereof can be implemented. It is noted that the supply voltage provide by the power supply over the power cable 5 is selected based on loading condition of the object being powered, e.g., the cleaner motor and other electronic circuitry loading requirements, as well as the characteristics of the wire conductors forming the cable 5, that is, their type (e.g., copper), length (e.g., 75 feet) and gauge (e.g., 16 gauge wire) of the conductors.

Referring generally to the left side of FIG. 3, the power supply controller 302 includes a microcontroller 200 having a transmitter line Tx, a transmit disable line TxD, a receiver line Rx, and an Analog-In line. The first conductor L1 has a first end that is configured to illustratively receive the DC supply line voltage Vs, e.g., 48 VDC from the power supply 4 and transfer the voltage to the Load 102, e.g., to the DC brush motor of the cleaner 100. The second conductor L2 is the return line from the Load 102 of the cleaner which is connected to a ground reference of the power supply 4 via a switching circuit 312, as discussed below in further detail.

In addition, the second conductor L2 is connected to either the transmit line Tx or the receive line Rx of the power supply microcontroller 200 via the switching circuit 312. For example, the transmitter line Tx can be coupled to the base of a high power transistor Q3 via a current limiting resistor R1 (e.g., 10K Ohms). The emitter of transistor Q3 is coupled to ground via a resistor R4 which preferably has a low resistance value (e.g., 0.01 Ohms), and the collector of transistor Q3 is coupled to the second conductor L2, which is the return line of the Load 102. The collector of Q3 is also connected to ground at node 314 through resistor R5 (e.g., 4.7K Ohms).

The transmit disable line TxD is connected to the base of transistor Q1 and the base of transistor Q2 via a current limiting resister R2 (e.g., 10K Ohms). The emitter of Q1 is connected to ground and the collector of Q1 is connected to the base of Q3. The emitter of Q2 is connected to the receive line Rx and the collector of Q2 is connected to node 314 via resistor R3 (e.g., 470 Ohms). A Zener diode D1 illustratively having a breakdown voltage of 5V is connected at its cathode to the emitter of transistor Q2 and the anode of D1 is connected to a ground reference of the power supply.

An amplifier 320 is further provided to detect/monitor power consumption. The amplifier 320 has its negative input terminal connected to the emitter of Q3 at node 316 via a current limiting resistor R6, and its positive input terminal connected to ground via offset resister R7. The output of the amplifier 320 is connected to the Analog-In line of the power supply microcontroller 200. A feedback resistor R8 is connected between the negative input terminal and the output of the amp 320. One of ordinary skill in the art will understand that the values of resistors R6-R8 are set based on the gain requirements of the amplifier 320. One of ordinary skill in the art will also appreciate that other current detecting devices can be implemented in place of the resistive current detection components shown in FIG. 3.

Referring generally to the right side of FIG. 3, the pool cleaner controller 103 includes circuitry 354 for temporarily powering the Load, i.e., the DC motor 102, and a microcontroller 360 having a transmitter line Tx, a transmit disable line TxD, and a receiver line Rx for exchanging communication signals with the microcontroller 200 of the power supply 4. In particular, the first conductor L1 of the cable 5, which carries the DC voltage signal (e.g., 48 VDC) from the power supply 4, is coupled at node 340 to the anode of a diode D3 of which the diode cathode is connected at node 341 to the DC motor (Load) 102 and to node 343 on the second conductor L2 via a capacitor C1. The capacitor C1 is coupled in parallel to the load between the first and second wire conductors. Additionally, the combination of the diode D3 and capacitor C1 collectively form the circuitry 354 which serves as a battery to provide electrical power to the DC motor 102 when the pulsed communication signals are sent to the cleaner microcontroller 360, as described below in further detail. The diode D3 can illustratively be a rectifier diode and the capacitor can illustratively have a capacitance of 3300 micro-farads, although such value is not considered limiting.

A voltage divider 352 is provided between the first and second conductors L1 and L2 of the cable 5, where a first end of a resistor R9 is connected to the first conductor L1 at node 340, the second end of resistor R9 is connected to a first end of resistor R10 at node 342, and the second end of resistor R10 is connected to the second conductor L2 of the cable 5 at node 343. The resistance value of R9 is preferably much greater than the resistance value of R10 so that the voltage divider 352 provides a low voltage signal to the receiver line Rx of the cleaner microcontroller 360.

The pool cleaner controller circuitry 103 further includes a low power transistor Q4 which has its emitter connected to the receive line Rx of the microcontroller 360 and its collector coupled to node 342 via resistor R11 (e.g., 470 Ohms). The collector of Q4 is also connected to the cathode of a Zener diode D2, of which the anode is connected to a ground reference of the cleaner. The base of Q4 and the base of a transistor Q5 are connected to the transmitter disable line TxD of the microcontroller 360 via current limiting resistor R12 (e.g., 10K Ohms), and the emitter of Q5 is connected to ground. The collector of Q5 and a base of transistor Q6 are connected to the transmit line TX of the microcontroller 360 via current limiting resistor R13 (e.g., 10K Ohms). The collector of Q6 is connected to the first conductor L1, and the emitter of Q6 is connected to the second conductor L2 at node 343 via resistor R14 (e.g., 10K Ohms).

Referring generally to FIG. 3 and in particular to the power supply controller circuitry 302, during normal operation of the above-described circuit 300, i.e., without any pulsed communication signals being sent by the power supply, the transmit line Tx of the microcontroller 200 is high (enabled), and the transmit disable line TxD is at a low state to prevent pulsed signals from being transmitted. Accordingly, the low-power transistors Q1 and Q2 are turned (switched) off, i.e., act as open circuits, and the high power transistor Q3 functions as a closed switch. Since the first conductor L1 is at a 48 VDC potential, current flows through the first conductor L1, through the motor (Load) 102 and returns to the power supply through the second conductor L2 to ground via resistor R4. Importantly the DC current that flows to the load 102 over the first conductor L1 also flows to capacitor C1, which stores the charge. Accordingly, when the transmit line Tx of the power supply microcontroller 200 is high, the receive line Rx is low, and vice versa.

Referring to the pool cleaner controller circuitry 103, while the transmit line Tx of the power supply microcontroller 200 is high, the receive line Rx of the cleaner's microcontroller 360 is set to a high state to receive communications signals from the power supply circuitry 103. While the receive line Rx of the cleaner microcontroller 360 is set to a high state, the corresponding transmit line Tx is normally at a low state and the transmit disable line TxD is set at a high state to disable transmission from the microcontroller 360. Accordingly, low power transistors Q4 and Q5 conduct and act as closed switches, while the low power transistor Q6 is turned off (open circuit). Accordingly, when the receive line Rx of the cleaner microcontroller 360 is high, the transmit line Tx is low, and vice versa. As well, when the transmit line Tx of the power supply microcontroller 200 is high, the receive line Rx of the cleaner microcontroller 360 is low, and vice versa. Thus, during normal operation, the power supply 4 provides a DC voltage suitable to drive the Load (DC motor) 102 without exchanging communications signals between the power supply 5 and the pool cleaner 100.

Communication signals are initiated by the power supply sending pulsed signals at a predetermined frequency for a predetermined time. Pulsing the illustrative 48 VDC power to the motor is accomplished by turning the transistor Q3 on and off, which in turn interrupts power flow along the second conductor L2. The microcontroller 200 includes programming that controls its transmit line Tx to thereby turn the transistor Q3 on and off, as well as control its TxD line to turn the Q2 transistor on and off. The transmit line Tx is normally in a high state and the transmit disable line TxD is normally in a low state. The transmit disable line TxD line controls when the microprocessor 200 transmits to or receives information from the controller 103 of the cleaner 100, as the system is a half-duplex circuit in which communications are enabled in one direction at a time. That is, the transmission and reception of information alternates over the cable 5. While one of the microcontrollers is transmitting, the other microcontroller only receives information and vice versa.

When a communication signal is being sent by the power supply microcontroller 200 it's transmit line Tx is pulsed from a high to a low state at a predetermined frequency (e.g., 10 microseconds), and the transmit disable line TxD remains in a high state. The pulsing of the microcontroller transmit line Tx causes the Q3 transistor to turn on and off at the same frequency and duration. When the Tx line is pulsed to a high state, the current through the Load 102 returns to ground through the second conductor L2 via resistor R4. Alternatively, when the Tx line is pulsed to a low state, Q3 becomes an open circuit and the capacitor C1 of the cleaner circuitry 103 serves as a battery which discharges current through the DC motor 102 to node 343 which acts as a momentary ground/reference point for the duration of the pulse. Accordingly, the diode D3 permits the flow of current from the capacitor C1 only in one direction through the Load 102, which thereby maintains constant current flow even though the 48 VDC supply voltage is being pulsed on and off at a predetermined frequency for a predetermined time.

The cleaner microcontroller 360 has its receiver line Rx that is normally in a high state and its Tx line and TxD lines are normally set at a low state and high state respectively. As noted above, Q3 is normally closed (short circuit) so that the voltage divider circuit 352 provides a high (e.g., 5 volt) potential to the Rx line of microcontroller 360 so that the microcontroller 360 can only receive communication signals from the power supply circuitry 302. When the transmit disable line TxD of microcontroller 360 is high, transistors Q4 and Q5 are turned on. Any communications signals or noise from the transmit line Tx of the microcontroller 360 would be forced to ground via transistor Q5.

During the intervals of sending pulsed signals to the cleaner circuitry 103, each time the Q3 transistor is pulsed off, the potential of the voltage divider circuit 352 goes to zero via the R5 resister which caused the receive line Rx of the microcontroller 360 go to a low state as well. Accordingly, the Rx line of the microcontroller 360 is pulsed on and off in response to the pulses sent by the power supply microcontroller 200.

The microcontroller 360 of the cleaner includes logic circuitry to interpret the pulsed signals received on its Rx line. Depending on the transmitted signals, the microcontroller 360 can take an appropriate action such as turning, reversing direction, changing cleaning programs according to sensed pool conditions, conducting diagnostics and the like. Referring to the power supply circuitry 302, since the power supply controller 302 sent the communications that require a response, when the communications are completed, the TxD line of the microcontroller 302 goes to a high state, which turns on transistors Q1 and Q2. Any communication signals or noise on the Tx line goes to ground via the Q1 transistor.

Referring now to the pool cleaner controller circuitry 103, the transmit line Tx of microcontroller 360 is pulsed on and off at predetermined intervals for a predetermined time to turn transistor Q6 on and off at the same frequency and time, which in turn passes the pulsed signals over the second conductor L2. In one embodiment, a current limiting resistor R14 is provided to protect the current to the Q2 transistor. When the pulse from the transmit line Tx of the cleaner microcontroller 360 is high, the receive line Rx of the power supply microcontroller 200 remains high. Alternatively, when the pulse from the transmit line Tx of microcontroller 360 is low, Q6 turns off and the receive line Rx of the power supply microcontroller 200 also goes low (to ground) via resistor R5.

Each microcontroller further includes a Zener diode connected between the Rx line and ground. The Zener diodes D1 and D2 are provided to regulate the high voltage at the Rx line to prevent an overvoltage condition. For example, if a high voltage were to exceed the breakdown voltage (e.g., 5 volts) of the Zener diode, the corresponding receive line Rx would maintain a 5 volt potential.

Accordingly, pulsed signals are initially sent by the power supply controller 302, and depending on the type of signals sent, the controller 103 of the cleaner can take appropriate actions including sending back pulsed information to the power supply.

Figure 4:
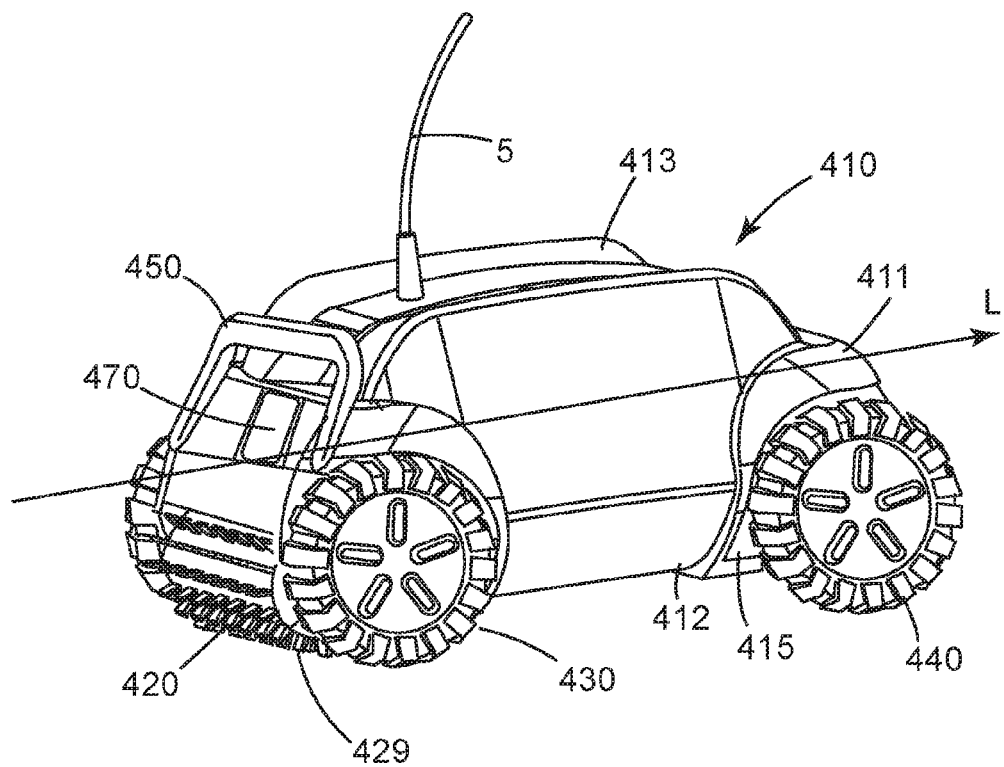
FIG. 4 is a top, front right side perspective view of a self-propelled robotic pool cleaner suitable for implementing the present invention.
Figure 5:
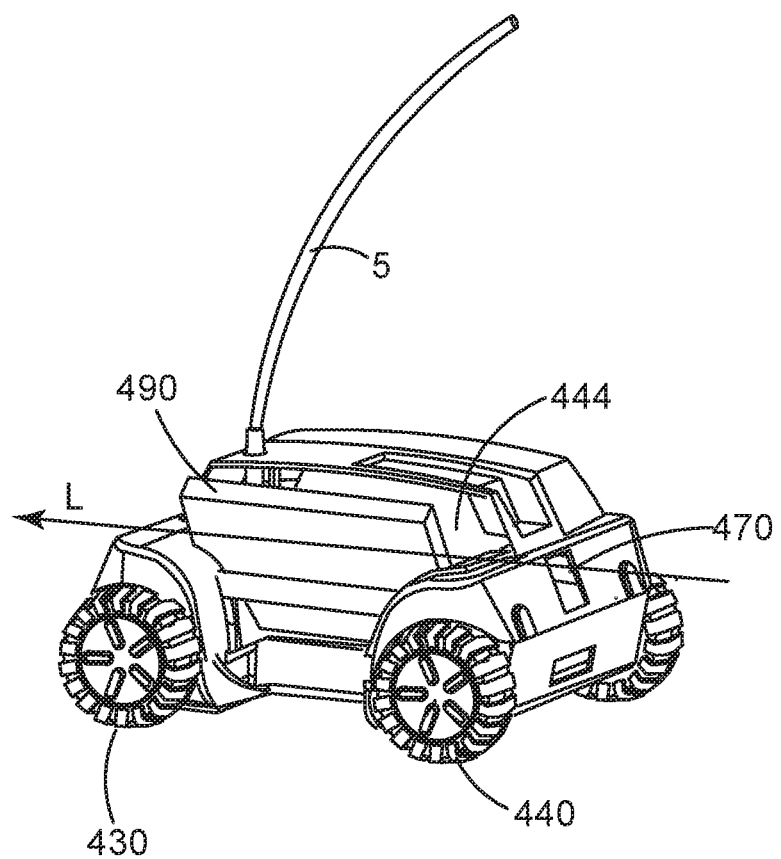
FIG. 5 is a top, rear right side perspective view of the pool cleaner of FIG. 4.

Referring to FIGS. 4-7, an illustrative example of a self-propelled robotic pool cleaner 410 that is suitable for implementing the method and system of the present invention is shown. Referring to FIGS. 4 and 5, the pool cleaner 400 includes a housing 411 having a bottom portion or base 12 and an upper portion which can form a cover 413 above the base 412. The base 412 and upper portion and/or cover 413 collectively define an interior chamber 44 in which a propulsion drive motor assembly 478 (FIG. 7), a filter 490 (FIG. 5), the power wash assembly 500 (FIG. 6) of the present invention, electronic controllers (not shown), and other cleaner assemblies and components are housed.

In one embodiment, the housing cover 413 is removably secured to the base 412 to define the interior chamber 444. The cover 413 and base 412 are removably fastened with one or more fasteners such as a clasp, latch, spring clip, bolt or other well-known and conventional fasteners. A gasket or other seal (not shown) can be inserted between the base 412 and cover 413 to prevent water flowing therebetween into and out of the interior chamber 444. The cover 413 and base 412 are preferably made of a polymer, such as polyvinylchloride (PVC), polypropylene, among other well-known thermoplastic materials, aluminum and/or alloys thereof, and/or combinations thereof, and/or other corrosion resistant, water impermeable materials.

The cleaner 410 is generally configured to be neutrally buoyant when submerged in the water. The housing 411 can include ballast and/or floats (not shown) to achieve a desired neutral buoyancy of the cleaner. In one embodiment, an external handle of the cleaner can be fabricated from a foam-like material to assist with floatation while the cleaner is positioned vertically on the side wall and is performing a cleaning operation along the water line of the pool. In another embodiment, the rear end of the cleaner can include a ballast material while the front end includes a float to assist the cleaner when climbing a vertical sidewall of the pool.

The cleaner includes a discharge conduit or port 470 that is formed in the upper portion of the housing 411 and which can be directed normally or at an acute angle with respect to the surface beneath the cleaner. Since the cleaner is generally neutrally buoyant, the downward thrust from a water jet being discharged from the discharge port 470 helps to stabilize and maintain the cleaner 10 on the surface being cleaned. As illustratively shown in FIGS. 4 and 5, a discharge conduit or port 470 is provided at the opposing ends (front and rear) and preferably centrally positioned on the longitudinal axis "L" of the cleaner 410.

Figure 7:
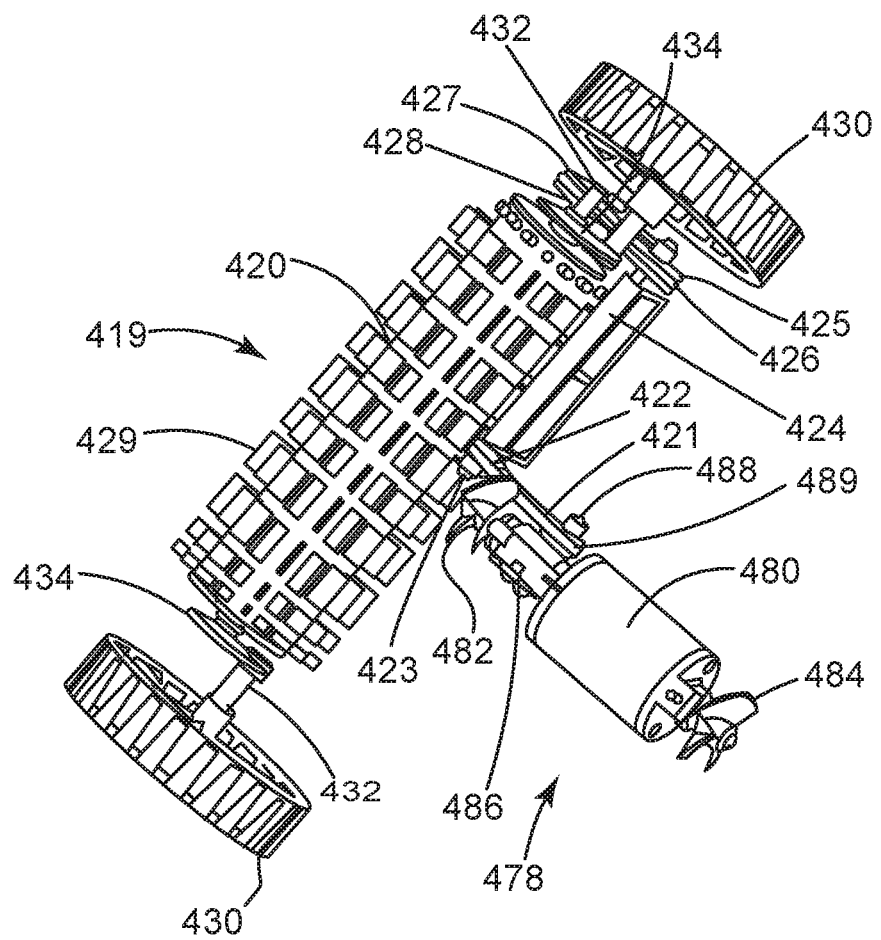
FIG. 7 is a bottom isometric view of the dual propeller motor and a brush assembly of the cleaner of FIG. 4.

The robotic pool cleaner 410 includes rotationally-mounted supports which are coupled to the housing 411 for moving and guiding the cleaner 410 over the submerged surface of the swimming pool or tank. The rotationally-mounted supports are illustratively, wheels 430 and 440 mounted on axles 432 (FIG. 7). A person of ordinary skill in the art will appreciate that the wheels 30, 40 are not considered limiting and are disclosed herein for illustrative purposes only. For example, the rotationally-mounted supports can be or include one or more of tracks, rollers, caster wheels and the like. As illustrated, the axles of the rotationally-mounted supports can be mounted transverse to the longitudinal axis L of the cleaner 410. In other embodiments, the mounting axle or axles are movable to a position that is other than normal to the longitudinal axis of the pool cleaner in order to produce movement of the cleaner 410 in an arcuate path. A detailed description of an endless track driven robotic cleaner is provided in U.S. application Ser. No. 13/719,633, the disclosure of which is incorporated by reference in its entirety.

Figure 6:
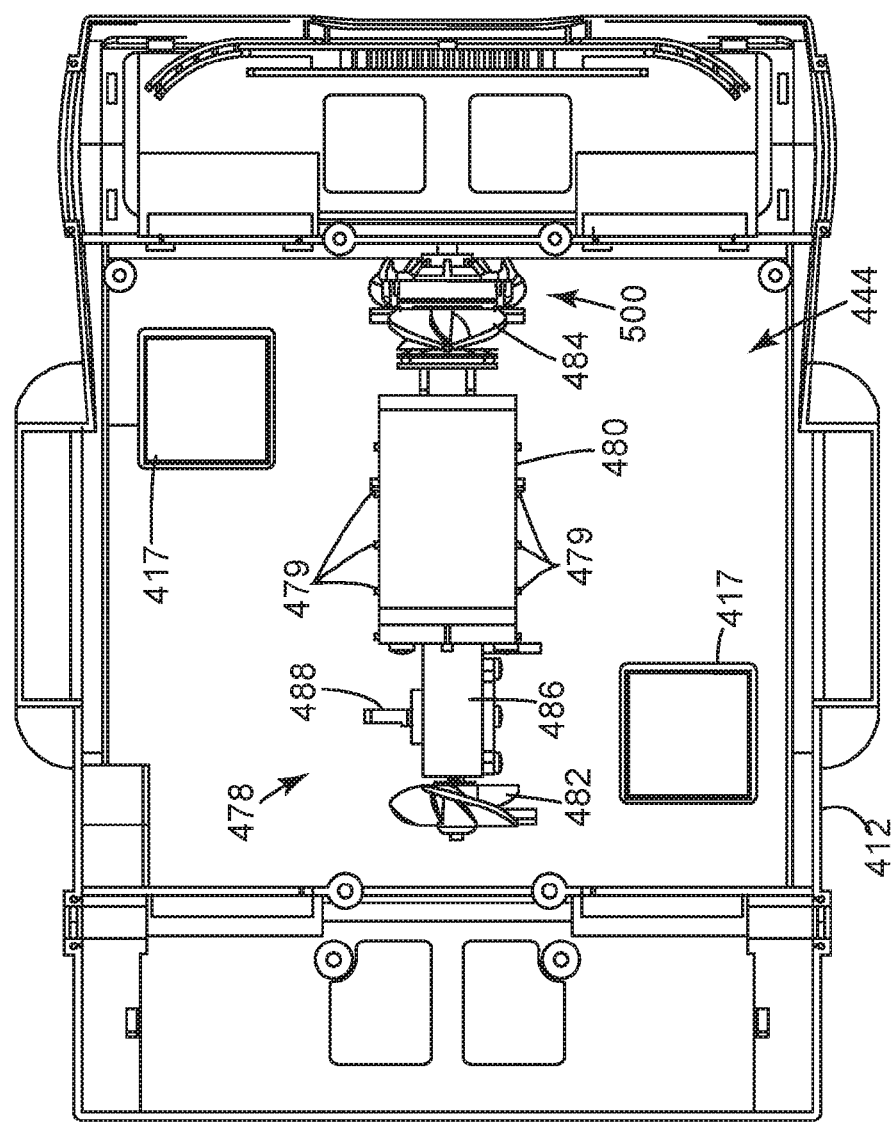
FIG. 6 is a top plan view of the base of the cleaner of FIG. 4 illustrating the dual propeller motor and water inlets.

Referring now to FIGS. 6 and 7, the cleaner 410 is propelled by a dual propeller electric motor assembly 478 that produces a jet of filtered water that is discharged through a water jet discharge conduit or port 470 (FIGS. 4 and 5) formed in the housing 411. The dual propeller motor eliminates the need for additional drive motors and/or gear trains as is commonly implemented in the prior art to directly engage and rotate one or more of the supporting wheels or tracks.

Control means (not shown) can be provided to steer and/or periodically reverse the direction of movement while performing a cleaning program, as well as to assure that the cleaner does not become immobilized, e.g., by an obstacle in the pool. If, for example, the pool cleaner does not change its orientation with respect to the bottom or sidewall as indicated by a signal from an on-board sensor (e.g., mercury switch) indicating that such transition has occurred during the prescribed period (e.g., two minutes), a control circuit will automatically reverse the polarity of the electric motor 480 to change the direction of movement in order to permit the cleaner to move away from the obstacle and resume its scanning pattern. Sensors, such as magnetic and infrared-responsive signaling devices can also be provided to change the direction of movement in response to prescribed conditions, e.g., absence of forward movement due to an obstacle. In addition, the control means can automatically steer the cleaner to the right or left while moving in either the forward or reverse direction. Power for the cleaner 410 is supplied by a buoyant electrical cable 5 attached to an external power source, such as the external power supply 4 (FIG. 1), a transformer or a remote battery contained in a floating housing at the surface of the pool, although such power sources are not to be considered as limiting and form no part of the invention.

Referring now to FIG. 6, the cleaner 410 includes at least one water inlet port 17 formed in the base 412. The bottom surface of the base 12 preferably includes an upwardly sloped or curved portion (not shown) formed around each water inlet port 417 to help channel or otherwise direct the flow of debris and water beneath the cleaner into the water inlet port 417.

Referring now to FIG. 5, the cleaner 410 includes a filter assembly 490 that is mounted within the interior chamber 444 over the water inlet ports 417 of the base 412. The filter assembly 490 is illustratively shown as being a filter cartridge, although such configuration is not limiting. For example, the filter assembly can be a filter basket having a mesh screen, a filter bag, a filter canister, a perforated or mesh screen or any other well-known filtering device.

In particular, the filter is positioned over the water inlet ports 417 such that water and debris from beneath the cleaner that is drawn into the interior chamber is captured by the filter and the debris cannot escape. A cover, check valve or flap valve can be provided over each water inlet port 417 to prevent reverse flow of the debris back into the pool when the cleaner is powered down. The water and debris that is drawn into the cleaner via the inlet port 417 is filtered, i.e., retained by the filter assembly 490 and the clean water that passes through the filter medium is discharged back into the pool through the one or more discharge ports 470.

As shown in FIGS. 4 and 5, the discharge conduit/port 470 is provided on the front and rear ends of the cleaner 410 and, preferably, the discharge conduits 470 are angled with respect to the surface below the cleaner. Referring to FIG. 4, when the filtered water is discharged through the left side discharge port 470 in the form of a pressurized water jet, the cleaner will move in a forward direction to the right.

Similarly, referring to FIG. 5, when the filtered water is discharged through the right side discharge port 470 in the form of a pressurized water jet, the cleaner will move in a forward direction to the left. Thus, the filtered water jet produces a drive motive force for moving the cleaner. As well, the front and rear portions of the cleaner 410 alternate back and forth based on the forward direction of movement of the cleaner. As shown in the drawings, the water jet discharged from the discharge port 470 is at an angle "a" to the translational plane of movement of the cleaner 410 and produces a force vector component in a downward direction towards the leading wheels, as well as a translational force vector tending to move the cleaner across the surface being cleaned. The orientation of the discharged water jet can be varied to provide a downward component or force vector, lateral components, or a combination of such components or force vectors to complement the translational force. For a detailed understanding of implementing a water jet drive for moving the cleaner, the reader is directed to commonly assigned U.S. Pat. No. 6,412,133 and commonly assigned US application publication Ser. No. 13/578,432, the content of which are incorporated by reference herein in their entireties.

Referring again to FIGS. 6 and 7, a water pump assembly 478 is mounted on a mounting structure 479 formed in the interior chamber 444 of the cleaner 410. The water pump assembly 478 illustratively includes an electric motor 480, a drive shaft 481, first a propeller 482 and a second propeller 484, in which the first and second propellers are mounted on opposing ends of the drive shaft 481. The electric motor 80 receives power from an external power supply via the electric cable 5. Rotation of at least one of the propellers 482, 484 causes the filtered water from the interior chamber 444 to flow an adjacent discharge port 470. The discharged filtered water creates a low water pressure environment within the interior chamber 444, which in turn induces water and debris from beneath the cleaner (which is at a higher pressure) to be drawn into the water inlet port 417 for filtering by the filter assembly and subsequent discharge through the discharge conduits 470. A detailed description of a horizontally mounted water pump assembly is provided in commonly assigned U.S. application Ser. No. 13/578,432 which includes a horizontally mounted electric motor with opposing dual propellers for propelling and providing filtering capabilities for the cleaner, the disclosure of which is incorporated by reference herein in its entirety. Additionally, a detailed description of a self-propelled robotic cleaner having a flap valve for alternatively discharging opposing streams of filtered water to propel the cleaner in a forward or reverse direction is disclosed in commonly assigned U.S. Pat. No. 7,165,284, the disclosure of which is incorporated by reference in its entirety.

The water pump assembly 478 is preferably mounted horizontally with respect to the base 412 to enhance flow of the filtered water through an adjacent discharge conduit 470. Preferably, both propellers rotate contemporaneously to expel the filtered water through one of the discharge ports 470. When the polarity of the electric motor is reversed, the electric motor and the propellers rotate in the opposite direction and the filtered water is expelled through the other discharge port 470 to reverse the direction of movement of the cleaner 410. Accordingly, the water pump assembly 478 causes the water to flow in and out of the cleaner 410 for purposes of filtering the water, as well as to propel the cleaner along the surface of the pool to be cleaned. Although the water pump is described as being a horizontally mounted dual propeller pump, such configuration is not limiting for purposes of the present invention. That is, a person of ordinary skill in the art will appreciate that other water pump assembly configurations may be implemented to practice the invention. For example, the water pump assembly can include a pair of water pumps with each pump having a propeller mounted to corresponding electric motor, a single propeller motor mounted horizontally, vertically or at an angle there between, and the like.

Referring to FIG. 7, the water pump assembly 478 can also be used to rotate a roller brush 420 of a brush assembly 419 which is positioned along the bottom of the base 412 to scrub the pool surface beneath the cleaner 410. As illustratively shown in the drawings, the brush assembly 419 comprises a roller brush 420 having a plurality of bristles or protruding members 429. The brush 420 can be made from molded polyvinyl chloride, expanded polymeric foam having a smooth surface and polymeric foam with a resilient textured surface, a ribbed solid polymer web that is formed into a cylindrical supporting surface, among other well-known roller brush materials.

The electric motor 80 includes a gear box 486 which translates the rotation of the electric motor 480 by 90° or some other angle and also reduces the number of rotations at a predetermined ratio. The gear box 486 has a takeoff spindle 88 which carries a first pulley 489 which transmits a rotational force to a gear train or preferably a drive belt system 421. The drive belt 421 in turn transmits this force to a second pulley 422 provided on a proximal end of a drive transfer shaft 423. The drive transfer shaft 423 can be supported by an elongated bushing 424. The drive transfer shaft 423 carries another (third) pulley 425 at its distal end which transmits the rotational force to a second drive belt 426. The second drive belt 426 is looped over a fourth pulley 427 which is free to rotate. The drive belt 426 frictionally engages the axle 428 of the roller brush 420. This facilitates slippage between the roller brush 420 and ultimately the electric motor 480, should the roller brush 420 encounter some type of obstacle like a large piece of debris on the surface being cleaned. This avoids the cleaner 410 becoming stalled by such obstacles and allows the cleaner 410 to pass over them. A detailed description of a suitable brush assembly 419, is disclosed in commonly assigned US application SN 2014/0137343, the disclosure of which is incorporated herein by reference in its entirety. One of ordinary skill in the art will appreciate that the brush assembly 419 is not to be considered limiting and is described herein for illustrative purposes only.

While the foregoing is directed to embodiments of the present invention, other and further embodiments and advantages of the invention will be apparent to those of ordinary skill in the art from this description and without departing from the scope of the invention, which is to be determined by the claims that follow.

What is claimed is:

1. A pool cleaning system for cleaning a submerged surface of a pool including a robotic pool cleaner electrically connected to a remote power supply via a two-wire electric cable having first and second conductors, the system comprising:

the robotic pool cleaner comprising:
a housing including an upper portion disposed over a base to define an interior chamber, the base including at least one water inlet and the upper portion having at least one water discharge port;
rotatably-mounted supports for supporting and guiding the cleaner on the pool surface;

a filter assembly for filtering water drawn through the at least one water inlet;

an electric motor mounted in the interior chamber and configured to move the cleaner on the pool surface; and a pool cleaner controller electrically connected to the electric motor for controlling movement of the cleaner and receiving communication signals transmitted by the remote power supply; and the remote power supply comprising:

a power supply controller for providing DC power to the electric motor of the cleaner over the two-wire electric cable, the power supply controller being configured to pulse the DC power at a predetermined frequency for a predetermined period of time to define the communication signals that are transmitted to the pool cleaner controller.

2. The pool cleaning system of claim 1, wherein the remote power supply includes an AC to DC power converter for converting AC power to DC power.

3. The pool cleaning system of claim 1, wherein the electric motor receives DC electric power at a substantially constant level and the pool cleaner controller receives the pulsed communication signal from the power supply controller.

4. The pool cleaning system of claim 3, wherein the pool cleaner controller includes a capacitor coupled parallel to the electric motor between the first conductor and the second conductor of the two-wire electric cable.

5. The pool cleaning system of claim 4, wherein the capacitor is charged by the two conductors during normal operation without a pulsed communication signal being sent by the power supply to the cleaner.

6. The pool cleaning system of claim 4, wherein the capacitor is discharged during a pulsed communication signal sent by the power supply to the cleaner.

7. The pool cleaning system of claim 6, wherein the current discharged by the capacitor flows to the electric motor during the pulsed communication signal.

8. The pool cleaning system of claim 1, wherein the first conductor of the two-wire electric cable has a first end configured to receive DC power from the power supply and a second end coupled to the electric motor via the pool cleaner controller, and the second conductor of the two-wire electric cable has a first end coupled to the electric motor via the pool cleaner controller and a second end coupled to the ground reference of the power supply via a switching circuit.

9. The pool cleaning system of claim 8, wherein the power supply controller includes a supply microcontroller and the second conductor is connected to either a transmit line Tx or a receive line Rx of the microcontroller via the switching circuit.

10. The pool cleaning system of claim 9, wherein the switching circuit comprises a switch coupled between the second end of the second conductor and the ground reference of the power supply.

11. The pool cleaning system of claim 10, wherein the switch is closed during normal operation when no pulsed communication signal is being sent by the power supply.

12. The pool cleaning system of claim 11, wherein the pulsed communication signal is generated by turning the switch on and off.

13. The pool cleaning system of claim 11, wherein during the normal operation current flows through the first conductor, through the motor and returns to a ground reference of the power supply over the second conductor.

14. The pool cleaning system of claim 10, wherein the switch is turned on and off at a predetermined frequency and for a predetermined period of time by the supply microcontroller to thereby define the pulsed communications signal.

15. The pool cleaning system of claim 1, wherein the pool cleaner controller and the power supply controller communicate with each other using a half-duplex communication mode of operation.

16. The pool cleaning system of claim 1, wherein the pool cleaner controller includes a cleaner microcontroller having a receiving line for receiving pulsed signals from the power supply controller and a transmission line for sending pulsed signals back to the power supply controller in response to the pulsed signals.

17. The pool cleaning system of claim 1, wherein the power supply controller includes a supply microcontroller having a transmission line for sending pulsed signals to the pool cleaner controller and a receiving line for receiving pulsed signals from the pool cleaner controller in response to the pulsed signals sent.

18. A robotic pool cleaner comprising:

a housing including an upper portion disposed over a bottom portion to define an interior chamber, the bottom portion including at least one water inlet and the upper portion having at least one water discharge port;

rotatably-mounted supports supporting and guiding the cleaner on the pool surface;

a filter assembly for filtering water drawn through the at least one water inlet;

an electric motor mounted in the interior chamber and configured to move the cleaner on the pool surface; and a pool cleaner controller electrically connected to the electric motor for controlling movement of the cleaner and receiving communication signals transmitted by a remote power supply over a two-wire electric cable having first and second conductors, wherein the pool cleaner controller is configured to provide electric power to the electric motor while the pool cleaner controller receives pulsed communication signal from the remote power supply over the two-wire cable.

19. The pool cleaner of claim 18, wherein the pool cleaner controller includes a capacitor coupled parallel to the electric motor between the first conductor and the second conductor of the two-wire electric cable.

20. The pool cleaner of claim 19, wherein the capacitor is charged by the two conductors during normal operation when no pulsed communication signal is being sent by the power supply to the cleaner.

21. The pool cleaner of claim 19, wherein the capacitor is discharged when a pulsed communication signal is sent by the power supply to the cleaner.

22. The pool cleaner of claim 18, wherein the pool cleaner controller includes a cleaner microcontroller having a receiving line configured to receive pulsed signals from a power supply controller of the power supply and a transmission line configured to send pulsed signals back to the power supply controller in response to the receipt of pulsed signals.

23. A method for sending pulsed signals from a remote power supply to a self-propelled robotic pool cleaner over a two-wire electric cable having first and second conductors, the method comprising:

converting AC power to DC power at the power supply;

transmitting the DC power from a power supply controller of the power supply to an electric motor and a pool cleaner controller on board the pool cleaner over the two-wire cable during normal cleaning operations;

pulsing the DC power on and off from the power supply at a predetermined frequency and for a predetermined period of time to define a pulsed communication signal;

providing power from the pool cleaner controller to the electric motor during a power interruption from the pulsed communication signal; and receiving the pulsed communication signal at the pool cleaner controller while providing power to the electric motor.

24. The method of claim 23, wherein after the step of receiving the pulsed communication signal at the pool cleaner controller, the method further comprises sending a pulsed return communications signal from the pool cleaner controller to the power supply controller over the two-wire cable.

25. The method of claim 23, wherein the step of providing power from the pool cleaner controller to the electric motor during a power interruption comprises directing current from a discharged capacitor to the electric motor.

26. The method of claim 23, wherein the step of pulsing the DC power on and off from the power supply comprises operating a switch coupled to the first conductor between the on and off position at the predetermined frequency and for the predetermined period of time.

* * * * *